United States Patent Office 3,101,781
Patented Aug. 27, 1963

3,101,781
MISCIBLE TYPE SLUG METHOD OF RECOVERING CRUDE OIL FROM RESERVOIRS
Carl Connally, Jr., Dallas, Tex., assignor to Socony Mobil Oil Company, Inc., a corporation of New York
No Drawing. Filed Feb. 15, 1960, Ser. No. 8,495
24 Claims. (Cl. 166—9)

This invention generally relates to the secondary recovery of petroleum hydrocarbons from subterranean reservoirs. More specifically, this invention relates to a miscible type slug method of increasing the ultimate recovery of crude oil from a reservoir.

Normally the initial recovery of crude oil from a subterranean reservoir is effected by utilizing any native energy which may exist within the reservoir to drive the oil through a well penetrating the reservoir to the surface. This form of oil recovery is generally referred to as "primary recovery." The native energy in a reservoir which is utilized in primary recovery methods may exist in the form of water, gas cap, or solution gas drive, either singularly or in various combinations thereof. While the employment of primary recovery methods is certainly a feasible method from an economic standpoint, it has long been recognized that such methods do not effect recovery of the largest quantity of oil obtainable from a reservoir.

Throughout the history of the petroleum industry, it has been realized that primary recovery methods leave behind large quantities of oil within a reservoir. Oftentimes more oil will be left within the reservoir than is recovered by means of primary production methods. Probably the earliest effort to improve the ultimate recovery of oil from a reservoir involved the introduction of water by a gravity flow. Following this came the discovery that by applying pressure to the water being introduced, even more oil could be driven from the reservoir to the producing wells. This method is even applied today, with the water often being introduced at a stage in the production long before the natural energy of the reservoir is dissipated in order to prevent the reservoir pressure ever dropping below the desired level. Along with the development of pressure water-flooding operations, there was conceived the idea of the introduction of gas into reservoirs in order to maintain the reservoir pressure, and this, like the water-flood method is one which has been widely used. Neither the water-flood nor the gas method of pressure maintenance has resulted in the ultimate recovery of all of the oil present in a reservoir. There has, therefore, developed in recent years a method of secondary recovery known as "miscible fluid displacement" in which a fluid miscible with the reservoir oil is introduced into the reservoir and driven through the reservoir by another fluid introduced behind it.

Among the approaches which have been employed within the miscible fluid displacement method to increase ultimate oil recovery have been injecting dry gas at very high pressures, cycling a rich casing-head gas or a drier gas enriched by the addition of propane or butane, and the injection of a slug of butane, or propane, or both and then following the slug with a dry gas. In the high-pressure dry gas method, the gas passes over a residual oil where it picks up light components, and with this enrichment the gas becomes highly soluble in the virgin reservoir oil and thus assists in reducing its viscosity and permitting its more ready removal from the reservoir. The high-pressure dry gas method, however, is applicable generally only to those reservoirs which have a bottom-hole pressure of a minimum of about 3,000 pounds per square inch. The enriched gas and slug method, however, are applicable to reservoirs having lower pressures. The present invention is concerned with a variation of the slug method of miscible fluid displacement.

Among the many problems encountered in satisfactorily carrying out a secondary recovery operation are the sweep efficiency of the medium being employed to displace the oil, the viscosity of the crude oil in place within the reservoir, and the relationship between the oil and the surfaces of the various minute passages through which the oil must pass in the formation to ultimately arrive at the production well or wells. The volumetric sweep efficiency of water in a formation is very good in that it tends to maintain a generally uniform front as it moves through the formation without the tendency for early fingering toward the production well, while, on the other hand, gas is prone to have a low sweep efficiency in that it develops fingers which extend rapidly toward the production well. The viscosity of the oil is, of course, a problem in that the heavier or more viscous the oil is the more difficult it is to drive it from the formation. Also, the tendency of the oil to adhere to the surfaces of various portions of the formation hampers its ultimate removal. The ideal secondary recovery method, therefore, is one in which the sweep efficiency is high, the viscosity of the oil in place is reduced, and the relationship between the oil in place and the surfaces of the formation is improved.

It is an object of the present invention to provide a method of secondary recovery of crude oil from a subterranean reservoir. It is another object of the invention to provide a method of secondary recovery of crude oil wherein the sweep efficiency of the driving mediums is improved, the viscosity of the reservoir oil is reduced, and the relationship between the surfaces of the portions of the formation and the reservoir oil is improved. It is a further object of the invention to provide a miscible fluid displacement type of secondary recovery of the slug form. These, and further objects of the invention, will be apparent to those skilled in the art from a reading of the following description of the invention.

In accordance with the invention, there is provided a slug type miscible fluid displacement form of secondary recovery wherein liquid ammonia is introduced into an injection well leading to a subterranean reservoir and maintained at a pressure in excess of the vapor pressure of ammonia at reservoir temperature to form a substantially liquid slug, and the slug of liquid ammonia is driven through the reservoir toward a production well along with the crude oil within the reservoir by means of a fluid which is substantially miscible with the liquid ammonia.

It has been found that the method of the invention employing a slug of liquid ammonia driven by fluid miscible therewith has a high sweep efficiency. It has also been found that liquid ammonia will mix to a large degree with the reservoir oil, resulting in a reduction in the viscosity of the oil. Further advantages of the employment of a slug of liquid ammonia are that the surface-active properties of the formation are so modified that the oil may be driven from the formation by the utilization of lower pressures, together with the fact that the liquid ammonia assists in driving interstitial water from the formation.

The use of liquid ammonia in the slug form is particularly advantageous in that ammonia is quite soluble in both oil and water, the ammonia decreases the oil-water interfacial tension, and the ammonia decreases the oil viscosity and causes a swelling in the oil volume. Liquid ammonia also is sufficiently miscible with noncondensible gases, such as nitrogen, air, and relatively dry natural gas such as separator gas, and also with natural gas products such as LPG or with hydrocarbons of 2 to 4 carbon atoms, that these various fluids, in addition to water, may be used as driving materials behind the liquid ammonia. The ammonia not only operates as a substantially miscible, substantially homogeneous liquid slug, but it also builds up additional slug material with the oil picked up in transit through the formation, thus creating in-situ material which is miscible in itself with the formation oil. The liquid ammonia is substantially miscible with aliphatic hydrocarbons of 3 or more carbon atoms per molecule, or with mixtures of such hydrocarbons at pressures above a minimum pressure defined by the vapor pressures of liquid ammonia at the temperatures of interest. While complete miscibility in all proportions is not always obtained throughout the large range of temperatures encountered in oil reservoirs, miscibility is sufficiently high that miscible type displacement is obtained. The slug of liquid ammonia provides a transition from the reservoir oil through to the driving fluid with highly effective displacement of the oil. Along the leading edge of the slug of ammonia, the ammonia mixes to a large degree with the reservoir oil, while along the trailing edge of the slug it mixes with the driving fluid and is effectively displaced through the oil reservoir.

The various embodiments of the present invention may be carried out utilizing conventional forms of equipment and patterns of injection and production wells which are well known to those skilled in the art. While a minimum of one production well and one injection well are required, it will be readily understood that any of the conventional patterns of well distribution utilized in secondary recovery operations, such as the commonly employed five-spot distribution of wells, may be used. It is not, therefore, intended that the method of the invention be limited to any particular apparatus or number or distribution of injection and production wells.

In general, the invention comprises the steps of establishing at least one input well into a subterranean oil-bearing reservoir and one outlet well leading from the reservoir, introducing through the input well into the formation at least one fluid which is substantially miscible with hydrocarbon oil comprising liquefied, normally gaseous, ammonia at a pressure in excess of the vapor pressure of ammonia at reservoir temperature, driving the liquid ammonia to at least one outlet well by means of a fluid which is substantially miscible with the liquid ammonia, and recovering hydrocrabon oil from at least one outlet well.

In one embodiment of the invention, liquid ammonia is injected through an input well into an oil-bearing reservoir at a pressure in excess of the vapor pressure of ammonia at reservoir temperature. Following the injection of the liquid ammonia, a driving fluid is introduced through the input well into the formation behind the liquid ammonia for the purpose of pushing the liquid ammonia through the formation. The driving fluid may comprise water, or it may be a noncondensible fluid, that is, one which is noncondensible at reservoir conditions of the temperature and pressure, such as air, nitrogen, or a hydrocarbon gas such as separator gas. Sufficient pressure is maintained on the formation through the input well to retain the pure liquid ammonia in the liquid phase as it is driven through the formation. It may be necessary to throttle the output well in order to maintain the desired pressure on the formation during the carrying out of the process. The introduction of the driving fluid is continued until the reservoir oil and the slug of liquid ammonia have been produced from the formation through the outlet well. Flow from the outlet well is continued until there is evidence of a breakthrough of the driving fluid, or in other words until the outlet well is producing solely the driving fluid. In this embodiment of the invention, the amount of liquid ammonia which is employed, that is, the quantity of the liquid ammonia comprising the slug, ranges from about 1 percent to about 20 percent of the pore volume of that portion of the formation which is to be swept for recovery of hydrocarbon oil between the inlet well or wells and the outlet well or wells. The pore volume of the portion of the formation which is to be produced by the method of the invention is readily determinable by well known principles of reservoir engineering. The particular volume requirements for the ammonia slug within the desired range are controlled to some extent by the proportion of interstitial water to oil within the formation. Where the relative amount of interstitial water is high, that is, about 30 percent to about 35 percent of the pore volume, the volume of the ammonia slug required for the development of a miscible transition zone will approach the specified upper limit of about 20 percent of the pore volume and, conversely, where the interstitial water content in the formation is low, lower volumes of ammonia are required.

It will be readily appreciated that during operation of the method of the invention the content of the fluid at various locations within the formation will vary. Due to the miscibility of the liquid ammonia, there will exist at the leading portion of the slug of ammonia a zone where the content of the fluid comprises a mixture of hydrocarbon oil and liquid ammonia. Progressing back into the slug of liquid ammonia itself, there is a point where there will be a zone of pure liquid ammonia, while along the zone between the driving fluid and the slug of liquid ammonia the fluid will comprise a mixture of liquid ammonia and the driving fluid due to the miscibility of the liquid ammonia with the driving fluid. Behind the transition zone between the liquid ammonia and the driving fluid toward the input well the formation will be substantially filled with only the driving fluid. It will be recognized that in this particular embodiment of the invention the liquid ammonia is being used as the sole miscible slug material and, therefore, the minimum pressure requirement which must be maintained throughout the carrying out of the method is controlled by the pressure necessary to maintain the pure ammonia in liquid form at the reservoir temperatures, together with the necessary pressure to overcome the back pressure of the formation itself and effect flow of hydrocarbon oil from the formation through the output well.

The high solubility of ammonia in water makes relatively simple high recovery of the ammonia from the outlet well effluent for recycle in the process or for use in recovery of oil from another formation. The ammonia may be recovered by either heating the oil effluent or scrubbing the effluent with water. The scrubbing water may comprise the first part of the effluent water from the formation which contains ammonia in relatively high concentration, or make-up water may be used. Water containing ammonia from the scrubbing operation may be recycled as such as driving water. The ammonia may also be recovered as such from water by heating the water solution of ammonia.

In a second embodiment of the invention, a slug of liquid ammonia is introduced into the formation through the input well as previously described in connection with the first embodiment. Following the introduction of the liquid ammonia slug, a slug of liquefied hydrocarbons is introduced into the formation through the input well behind the slug of liquid ammonia. Gas is then introduced into the formation to drive the liquid ammonia slug and the liquefied hydrocarbons. The slug of liquefied hydrocarbons may be liquefied propane, liquefied butane, or a mixture of liquefied, normally gaseous, hycarbons generally known as LPG, which is predominantly propane and may contain minor amounts of ethane, butane, and only small amounts of paraffinic hydrocarbons of molecular weight higher than butane. In this particular embodiment of the invention, the quantity of the liquid ammonia slug ranges from about 1 percent to about 20 percent of the pore volume of the portion of the formation to be swept, and the amount of hydrocarbon slug material also ranges from about 1 percent to about 20 percent of the bore volume of the formation to be swept. The pressures which necessarily must be maintained within the formation in the carrying out of this embodiment of the invention are controlled by the requirements for obtaining miscibility between the driving gas and hydrocarbons, which pressures usually are somewhat higher in order than required for the ammonia alone. If the hydrocarbon material is primarily propane or LPG, pressures in excess of about 1,000 p.s.i. gauge are required in order to maintain miscibility between driving gas and the hydrocarbon liquid. In this particular embodiment, the fluid injected subsequent to the liquefied hydrocarbon slug is preferably natural gas. This embodiment of the invention has the advantage of preconditioning the reservoir oil ahead of the liquid hydrocarbon slug and thus better displacement efficiency may be obtained than is realized in methods wherein a liquefied hydrocarbon slug alone is used. The liquid ammonia slug ahead of the liquid hydrocarbon slug aids in driving interstitial water from the formation, thus providing an in-situ water flood ahead of the miscible flood and leaving the formation in better condition with respect to surface properties for the purging of any residual reservoir oil from the formation by the liquefied hydrocarbon slug which follows the ammonia slug.

A third embodiment of the invention comprises the introduction into the formation of a slug of liquefied hydrocarbons, following the first slug with a slug of liquefied ammonia, and driving the dual slug through the formation to the outlet well or wells by means of water. In this embodiment of the invention, the quantities of the liquefied hydrocarbon slug and the liquid ammonia slug, respectively, are the same as specified above with respect to the second embodiment of the invention. The minimum pressure required to carry out this embodiment of the invention is determined by the greater of the vapor pressures of ammonia or of the liquefied hydrocarbons. For example, if the liquefied hydrocarbon slug is primarily propane or LPG, the minimum pressure is in excess of 500 p.s.i. gauge where the temperature is above about 175° F. The hydrocarbon material employed in slug form in this embodiment may be $C_3$ of $C_4$ paraffinic, normally gaseous, hydrocarbons or mixtures containing these hydrocarbons in major amounts, such as LPG which has been defined hereinabove. The hydrocarbons may also be normally liquid paraffinic hydrocarbon mixtures, such as naphthas, kerosene, or gasoline. The presence of the liquid ammonia behind the liquefied hydrocarbon slug serves as a buffer between the slug of hydrocarbon material and the water. The ammonia is substantially miscible with the hydrocarbon slug and also is substantially miscible with the water driving fluid. The hydrocarbon slug is miscible with the reservoir oil, the liquid ammonia is substantially miscible with the hydrocarbon slug material, and the water and liquid ammonia are substantially miscible. There will, therefore, be throughout the formation various transition zones, such as between the reservoir oil and the hydrocarbon slug material wherein there will be a mixture of reservoir oil and hydrocarbon slug material. The transition zone between the hydrocarbon slug material and the liquid ammonia slug will comprise a mixture of these materials; while between the zones containing predominantly liquid ammonia and predominantly water, there will be a transition zone in which the material is a mixture of ammonia and water. The ammonia prepares a formation with respect to surface properties for a better cleanup of residual reservoir oil, if any, by the water drive, and it also aids in directly obtaining a better recovery of the reservoir oil, if any, because of its miscibility with the reservoir oil. As in the previously described embodiments, the slug materials, that is, the liquefied hydrocarbon slug and the liquid ammonia slug, are driven through the formation and outwardly from the formation through the producing well by the water driving fluid, and such is continued until the outlet well is producing predominantly the water driving fluid. At such time, substantially all, if not all, of the reservoir oil, in the portion of the reservoir contacted by the injected fluids, will have been removed from the reservoir through the outlet well.

In another embodiment of the invention, liquid ammonia is mixed with liquid hydrocarbon material to obtain a substantially homogeneous slug containing the two materials, which are substantially miscible with each other and are substantially miscible with the residual oil within the formation being produced. The mixture of liquefied hydrocarbon material and liquid ammonia is introduced as a single, substantially homogeneous, slug through the input well and into the formation. The slug may contain from about 5 percent to about 95 percent liquid ammonia, and from about 95 percent to about 5 percent liquid hydrocarbon materials. The liquid hydrocarbon materials preferably are predominantly paraffinic hydrocarbon of not more than 4 carbon atoms, in other words LPG, preferably containing a predominance of $C_3$ and/or $C_4$ paraffinic hydrocarbons which may be enriched with $C_5$ hydrocarbons. The liquid hydrocarbons employed may be higher boiling hydrocarbons, such as gasoline, kerosene, naphtha, or gas oil. Where the liquid ammonia is the major component, that is, where it comprises more than about 50 percent of the composite slug, the composite slug preferably is driven through the formation by means of water but it may be driven by a natural gas, such as separator gas. Where the composite slug contains a major proportion of liquid hydrocarbon material, it is driven through the formation to the output well preferably by means of a driving fluid comprising natural gas, such as separator gas. The total amount or volume of the composite slug preferably lies within the range from about 2 percent to about 25 percent of the pore volume of the formation to be swept by the composite slug. The pressures necessary to carry out this embodiment of the invention are determined by the requirement of maintaining the liquefied hydrocarbon material in liquid form. If the liquefied, normally gaseous, hydrocarbon material is primarily propane or LPG and the driving fluid is water, pressures in excess of about 500 p.s.i. gauge are required, particularly at temperatures above about 175° F. Where the driving fluid is relatively lean natural gas and the composite slug is predominantly liquefied hydrocarbon material, pressures required to carry out this embodiment are above about 1,000 p.s.i. gauge.

While example injection pressures have been given with respect to each of the above-discussed embodiments, it is to be understood that the injection pressures for all of the fluids, where natural gas and LPG are utilized, should preferably be above the cricondenbar for all mixtures of LPG and natural gas at reservoir temperature. As used herein, the cricondenbar is the maximum pressure at reservoir temperature at which two phases can exist for any mixture consisting of the injected natural gas or natural gas present in the formation and the LPG which is injected. Such injection pressure generally will fall within the range of about 1,000 to 2,000 p.s.i. gauge.

The following is an example of a test conducted to demonstrate the effectiveness of the method of the invention. A formation to be produced by the method of the invention was represented by a sand-packed tube having a length of 50 feet and an internal diameter of 0.301 inch. The tube was packed with sand of a particle size range capable of passing through a 60-mesh screen. The sand was initially saturated with water and was flushed with a crude oil having a 38° API gravity, and with natural gas in solution, until the efflux of water ceased. This preparatory procedure provided a sand-packed tube containing fluid consisting of 83 percent crude oil with dissolved natural gas and 17 percent water. This value of water saturation is representative of the water saturation of natural reservoirs, which usually fall within the range of 10 percent to 25 percent saturation. While the sand-packed tube was maintained at 1,860 p.s.i. gauge by means of back pressure and the temperature of the pack was maintained at 130° F., a slug of liquid ammonia was pressured into the tube. Injection of the liquid ammonia was continued until the efflux from the tube was 100 percent ammonia. The efflux was analyzed to provide information with respect to the volume of ammonia in the transition zone, that is, the zone of flowing mixture of ammonia and reservoir oil which varies from high-oil, low-ammonia concentration to low-oil, high-ammonia concentration, extending from the first breakthrough of ammonia to the last production of oil effluent. It was found that the volume of ammonia required for development of the oil-ammonia transition zone was 13.5 percent of pore volume in the sand-packed tube.

The drive of liquid ammonia was followed by a water drive through the sand-packed tube which was continued until the last traces of ammonia were removed from the effluent. The flux in this step was analyzed for ammonia and water from the first water breakthrough until the water drive contained no traces of ammonia. This portion of the test provided information with respect to the amount of ammonia necessary for the development of the trailing ammonia-water transition zone. The volume of ammonia for the ammonia-water transition zone was found to be 6.5 percent of the pore volume of the sand-packed tube. The total amount of ammonia required for the two transition zones defines the maximum amount of ammonia required for the complete ammonia-drive process. The total for these two transition zones, thus, is the sum of the two figures given above, that is, 20 percent of the pore volume of the sand-packed tube. After establishment of the initial transition zone, the zone does not increase in volume directly with the distance traversed by the transition zone but rather more nearly according to the square root of such distance traversed. Hence, the greater the distance traversed, the lower is the amount of ammonia injected in relation to the pore volume to be swept. Usually the distance between input and outlet wells is at least 250 feet.

During the drive with liquid ammonia, 79 percent of the oil in the sand-packed tube at the initiation of the drive was recovered as effluent. An additional 1 percent of the oil initially present was recovered by the water drive following the ammonia slug. Since recovery by water drive alone usually results in about 60 percent of the reservoir oil being produced, the results of the present experiment indicate a 33 percent increase in recovery of reservoir oil.

In another test illustrative of the invention, a sand-packed tube of the same dimensions and prepared in the same manner as the tube described above was saturated with a refined hydrocarbon mixture of the kerosene boiling range, which represented and will be referred to hereinafter as reservoir oil. While the tube was maintained at 130° F. and a pressure of 750 p.s.i. gauge by means of a back pressure regulator, liquid propane was introduced into one end of the tube and reservoir oil was allowed to flow from the other end of the tube. The efflux from the tube was analyzed to determine the volume of propane in the propane-reservoir oil transition zone, that is, the zone in which there was a mixture of propane and reservoir oil, which zone extended from the first breakthrough of propane from the tube to the last production of reservoir oil from the tube. It was found that 100 percent of the reservoir oil originally in the tube was recovered and the amount of propane required for the propane-reservoir oil transition zone was equal to 6.05 percent of the pore volume of the tube. At this stage in the experiment, the tube was entirely saturated with propane inasmuch as all of the reservoir oil had been recovered.

The next step in the test was to introduce ammonia into one end of the tube while allowing propane to flow from the other end of the tube. The effluent from the tube was analyzed to determine the amount of ammonia and propane in the ammonia-propane transition zone, that is, the zone containing a mixture of ammonia and propane extending from the first breakthrough of ammonia to the last production of propane from the tube. It was found that all of the propane initially within the tube was recovered and the amount of propane in the ammonia-propane transition zone was 6.1 percent of the pore volume of the tube. The amount of ammonia in the ammonia-propane transition zone was found to be 6 percent of the pore volume of the tube. At this stage in the experiment, the tube was entirely saturated with ammonia since all of the propane had been recovered from the tube.

The last step in the test was to introduce water into one end of the tube while allowing ammonia to flow from the other end of the tube. The efflux from the tube was analyzed to determine the volume of ammonia in the ammonia-water transition zone, which is that zone containing a mixture of ammonia and water extending from the first breakthrough of water from the tube to the last of the ammonia flowing from the tube. It was determined that all of the ammonia was recovered from the tube and the amount of ammonia in the ammonia-water transition zone was 6 percent of the pore volume of the tube.

The above discussed test demonstrates that a volume of propane equivalent to 12.15 percent of the pore volume of the tube injected into a sand-packed tube initially saturated with oil and followed by a volume of ammonia equal to 12 percent of the pore volume of the tube and driven by water provides sufficient propane and ammonia for the miscible transition zones and results in 100 percent recovery of the reservoir oil with the tube being left saturated with water. Recovery by a water drive alone, without the use of slugs of propane and ammonia as above described, usually results in about 60 percent of the reservoir oil being recovered. The results of this test utilizing propane followed by ammonia ahead of a water drive indicates a 66 percent increase in recovery of reservoir oil.

What is claimed is:

1. In a method of producing oil from a subterranean reservoir provided with at least one injection well and one production well the steps which comprise introducing a liquefied, normally gaseous fluid comprising ammonia into said reservoir through said injection well at a pressure above the vapor pressure of said ammonia at reservoir temperature, thereafter introducing into said reservoir through said injection well a driving fluid at a pressure sufficient to maintain said ammonia above the vapor pressure of ammonia at reservoir temperature and displace said ammonia through said reservoir in the direction of said production well, and withdrawing fluids including said oil from said production well until the effluent flowing therefrom substantially comprises said driving fluid.

2. The method of claim 1 wherein the quantity of liquid ammonia ranges from about 1 percent to about 20 percent of the pore volume of said reservoir.

3. The method according to claim 1 wherein the driving fluid comprises water.

4. The method according to claim 1 wherein the driving fluid comprises a fluid which is noncondensible at reservoir conditions.

5. The method according to claim 1 in which the driving fluid comprises air.

6. The method in accordance with claim 1 in which the driving fluid comprises nitrogen.

7. The method in accordance with claim 1 in which the driving fluid comprises natural gas.

8. In a method of producing oil from a subterranean reservoir provided with at least one injection well and one production well the steps which comprise introducing a liquefied, normally gaseous fluid comprising ammonia into said reservoir through said injection well at a pressure above the vapor pressure of said ammonia at reservoir temperature, introducing into said reservoir through said injection well a liquefied, normally gaseous hydrocarbon fluid at a pressure sufficient to maintain said hydrocarbon fluid in liquid form within said reservoir, said pressure being at least greater than the vapor pressure of ammonia at said reservoir temperature, thereafter introducing into said reservoir through said injection well a driving fluid comprising natural gas at a pressure above the cricondenbar for all mixtures of said hydrocarbon fluid and said natural gas and sufficient to displace said hydrocarbon fluid and said ammonia through said reservoir in the direction of said production well, and withdrawing fluid including said oil from said production well until the effluent flowing therefrom substantially comprises said driving fluid.

9. The method according to claim 8 wherein the quantity of ammonia ranges from about 1 percent to about 20 percent of the pore volume of said reservoir and the quantity of hydrocarbon fluid ranges from about 1 percent to about 20 percent of the pore volume of said reservoir.

10. The method according to claim 8 wherein the liquefied, normally gaseous hydrocarbon fluid comprises propane.

11. The method according to claim 8 wherein the liquefied, normally gaseous hydrocarbon fluid comprises butane.

12. The method according to claim 8 wherein the liquefied, normally gaseous hydrocarbon fluid comprises LPG.

13. In a method of producing oil from a subterranean reservoir provided with at least one injection well and one production well the steps which comprise introducing a fluid comprising a liquefied, normally gaseous hydrocarbon fluid into said reservoir through said injection well at a pressure above the vapor pressure of said hydrocarbon fluid at the temperature of said reservoir, introducing into said reservoir through said injection well a liquefied, normally gaseous fluid comprising ammonia at a pressure above the vapor pressure of said ammonia at said reservoir temperature, thereafter introducing into said reservoir through said injection well a driving fluid comprising water at a pressure above the greater of the vapor pressures of said ammonia and said hydrocarbon fluid at said reservoir temperature and sufficient to displace said hydrocarbon fluid and said ammonia through said reservoir in the direction of said production well, and withdrawing fluids including said oil from said production well until the effluent flowing therefrom substantially comprises said driving fluid.

14. The method in accordance with claim 13 wherein the quantity of hydrocarbon fluid ranges from about 1 percent to about 20 percent of the pore volume of said reservoir and the quantity of liquid ammonia ranges from about 1 percent to about 20 percent of the pore volume of said reservoir.

15. A method in accordance with claim 13 in which the hydrocarbon fluid employed comprises a mixture of $C_3$ and $C_4$ hydrocarbons.

16. The method according to claim 13 in which the hydrocarbon fluid employed comprises $C_3$ hydrocarbon.

17. The method according to claim 13 wherein the hydrocarbon fluid employed comprises $C_4$ hydrocarbon.

18. The method according to claim 13 wherein the hydrocarbon fluid employed comprises LPG.

19. The method according to claim 13 wherein the hydrocarbon fluid employed comprises naphtha.

20. In a method of producing oil from a subterranean reservoir provided with at least one injection well and one production well the steps which comprise introducing into said reservoir through said injection well a liquefied, normally gaseous fluid comprising a mixture of ammonia and a hydrocarbon fluid at a pressure sufficient to establish and maintain said mixture as a substantially liquefied slug within said reservoir, thereafter introducing into said reservoir through said injection well a driving fluid at a pressure sufficient to maintain said mixture in liquid form and displace said mixture through said reservoir in the direction of said production well, and withdrawing fluids including said oil from said production well until the effluent flowing therefrom substantially comprises said driving fluid.

21. The method according to claim 20 in which the said fluid mixture comprises about 5 percent to about 95 percent ammonia and from about 95 percent to about 5 percent hydrocarbon fluid.

22. In a method according to claim 20 wherein the quantity of the said fluid mixture employed ranges from about 2 percent to about 25 percent of the pore volume of the reservoir.

23. In a method according to claim 20 wherein said ammonia comprises in excess of 50 percent of said fluid mixture and said driving fluid comprises water.

24. In a method according to claim 20 wherein said hydrocarbon fluid comprises in excess of 50 percent of said fluid mixture and said driving fluid comprises natural gas.

References Cited in the file of this patent

UNITED STATES PATENTS

| 2,742,089 | Morse et al. | Apr. 17, 1956 |
| 2,776,714 | Stanclift et al. | Jan. 8, 1957 |
| 2,813,583 | Marx et al. | Nov. 19, 1957 |
| 2,822,872 | Rzasa et al. | Feb. 11, 1958 |
| 2,875,830 | Martin | Mar. 3, 1959 |
| 2,875,833 | Martin | Mar. 3, 1959 |

FOREIGN PATENTS

| 696,524 | Great Britain | Sept. 2, 1953 |